(12) United States Patent
Nishida (10) Patent No.: US 10,786,421 B2
(45) Date of Patent: Sep. 29, 2020

(54) IMAGE DISPLAY SYSTEM, IMAGE DISPLAY METHOD, AND PROGRAM

(71) Applicant: NETAPPLI CO., LTD., Kahoku-gun, Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 16/491,077

(22) PCT Filed: Mar. 5, 2018

(86) PCT No.: PCT/JP2018/008307
§ 371 (c)(1),
(2) Date: Sep. 4, 2019

(87) PCT Pub. No.: WO2018/164046
PCT Pub. Date: Sep. 13, 2018

(65) Prior Publication Data
US 2020/0009009 A1    Jan. 9, 2020

(30) Foreign Application Priority Data

Mar. 7, 2017   (JP) ................................ 2017-043222

(51) Int. Cl.
*A61H 19/00* (2006.01)
*A63F 13/215* (2014.01)
(Continued)

(52) U.S. Cl.
CPC ........... *A61H 19/32* (2013.01); *A63F 13/215* (2014.09); *A63F 13/245* (2014.09);
(Continued)

(58) Field of Classification Search
CPC ........ A61H 19/00; A61H 19/30; A61H 21/00; A61H 23/00
(Continued)

(56) References Cited

U.S. PATENT DOCUMENTS

2015/0366748 A1   12/2015   Cambridge

FOREIGN PATENT DOCUMENTS

JP   2002136764 A   5/2002
JP   3113563 U    9/2005
(Continued)

OTHER PUBLICATIONS

International Search Report (ISR) dated May 15, 2018, issued for International application No. PCT/JP2018/008307. (2 pages).

*Primary Examiner* — John P Lacyk
(74) *Attorney, Agent, or Firm* — Law Office of Katsuhiro Arai (57) ABSTRACT

In an exemplary embodiment, an image display system 1 includes an input unit 50 and an information processing unit 10; wherein an input unit has a massaging apparatus 54 for massaging a human body part, and a microphone 52 placed inside or outside the massaging apparatus to detect sounds near the massaging apparatus; and the information processing unit has a sound volume determination means 310 for determining whether or not the sound volume of the sounds detected by the microphone exceeds a pre-determined threshold, and a display means 90 for displaying content constituted by a combination of image data and sound data, by modifying them according to the determination result as determined by the sound volume determination means. The image display system can augment massaging.

8 Claims, 10 Drawing Sheets

Image display system 1

(51) Int. Cl.
  *A63F 13/245* (2014.01)
  *A63F 13/424* (2014.01)
  *A63F 13/52* (2014.01)
  *G06F 3/01* (2006.01)

(52) U.S. Cl.
  CPC ............ *A63F 13/424* (2014.09); *A63F 13/52* (2014.09); *G06F 3/011* (2013.01)

(58) Field of Classification Search
  USPC .......................................................... 600/38
  See application file for complete search history.

(56) References Cited

FOREIGN PATENT DOCUMENTS

| | | |
|---|---|---|
| JP | 2006075422 A | 3/2006 |
| JP | 2008521070 A | 6/2008 |

[FIG. 1]

Image display system 1

Information processing unit 10

Image display processing (S40)

Image display system 4

IMAGE DISPLAY SYSTEM, IMAGE DISPLAY METHOD, AND PROGRAM

CROSS REFERENCE to RELATED APPLICATIONS

This application is the U.S. National Phase under 35 U.S.C. § 371 of International Application PCT/JP2018/008307, filed Mar. 5, 2018, which claims priority to Japanese Patent Application No. JP2017-043222, filed Mar. 7, 2017. The International Application was published under PCT Article 21(2) in a language other than English.

TECHNICAL FIELD

The present invention relates to an image display system.

BACKGROUND ART

For example, Patent Literature 1 discloses a motor-driven apparatus control system characterized by comprising: a motor-driven apparatus with an operation part driven by an electric motor; a recording medium storing video data and sound data of an adult content as well as control data for the motor-driven apparatus corresponding to the adult content; a means for reading the video data and sound data in the recording medium and playing back the video and sound; a means for reading the control data in the recording medium and generating control signals for the motor-driven apparatus; and a means for displaying the control signals on the motor-driven apparatus and controlling its movements in synchronization with the specific details of the video and sound.

BACKGROUND ART LITERATURE

Patent Literature

[Patent Literature 1]: Japanese Patent Laid-open No. 2006-75422

SUMMARY OF THE INVENTION

Problems to be Solved by the Invention

An object of the present invention is to provide an image display system that can augment massaging.

Means for Solving the Problems

The image display system proposed by the present invention is an image display system that includes an input unit and an information processing unit; wherein the input unit has a massaging apparatus for massaging a human body part, and a microphone placed inside or outside the massaging apparatus to detect sounds near the massaging apparatus; and the information processing unit has a sound volume determination means for determining whether or not the sound volume of the sounds detected by the microphone exceeds a pre-determined threshold, and a display means for displaying contents constituted by a combination of image data and sound data, by modifying them according to the determination result as determined by the sound volume determination means.

Additionally, the human body part is the external genitalia; a portion of the massaging apparatus that comes in contact with the human body part to be massaged is formed by a soft material; the microphone detects sounds generated from the rubbing of the external genitalia against the massaging apparatus; and the display means modifies the content to be displayed according to the sound volume of the sounds generated from the rubbing of the external genitalia against the massaging apparatus and displays the resulting content.

Additionally, further provided is a frequency range selection means for selecting a frequency range for the rubbing sounds, among the sounds detected by the microphone, which are primarily from the rubbing of the external genitalia against the massaging apparatus; the sound volume determination means determines, within the frequency range of the rubbing sounds from the rubbing of the external genitalia against the massaging apparatus as selected by the frequency range selection means, whether or not the sound volume of the rubbing sounds exceeds a pre-determined threshold; and the display means displays a content created according to the determination result as determined by the sound volume determination means.

Additionally, the massaging apparatus has a lubricant applied on the inside or outside of the massaging apparatus; the microphone detects sounds near the massaging apparatus on which the lubricant has been applied; the sound volume determination means determines whether or not the sound volume of the rubbing sounds including sounds generated by the lubricant exceeds a pre-determined threshold; and the display means displays a content according to the determination result as determined by the sound volume determination means.

Additionally, the information processing unit is a combined mobile device that has been combined with a display unit that displays content, and further has a connection cable for connecting the input unit and the combined mobile device so that the rubbing sounds detected by the microphone can be transmitted; and the display means modifies the content to be displayed on the display unit according to the sound volume of the rubbing sounds transmitted via the connection cable and displays the resulting content.

Additionally, the information processing unit further has a communication means for communicating captured content; and the display means displays the content received from the communication means by switching them according to the sound volume of the detected sounds.

The image display method proposed by the present invention comprises, in an image display system that includes: an input unit having a massaging apparatus for massaging a human body part, and a microphone placed inside or outside the massaging apparatus to detect sounds near the massaging apparatus; and an information processing unit; a step to detect sounds via the microphone of the input unit; and a step to display content constituted by a combination of image data and sound data, by modifying them according to the sound volume of the detected sounds.

The program proposed by the present invention is designed to cause a computer to implement, in an image display system that includes: an input unit having a massaging apparatus for massaging a human body part, and a microphone placed inside or outside the massaging apparatus to detect sounds near the massaging apparatus; and an information processing unit; a step to detect sounds via the microphone of the input unit; and a step to display contents constituted by a combination of image data and sound data, by modifying them according to the sound volume of the detected sounds.

Effects of the Invention

According to the present invention, massaging of the human body can be augmented.

MODE FOR CARRYING OUT THE INVENTION

EXAMPLE 1

Embodiments of the present invention are explained based on the respective drawings.

Figure 1:
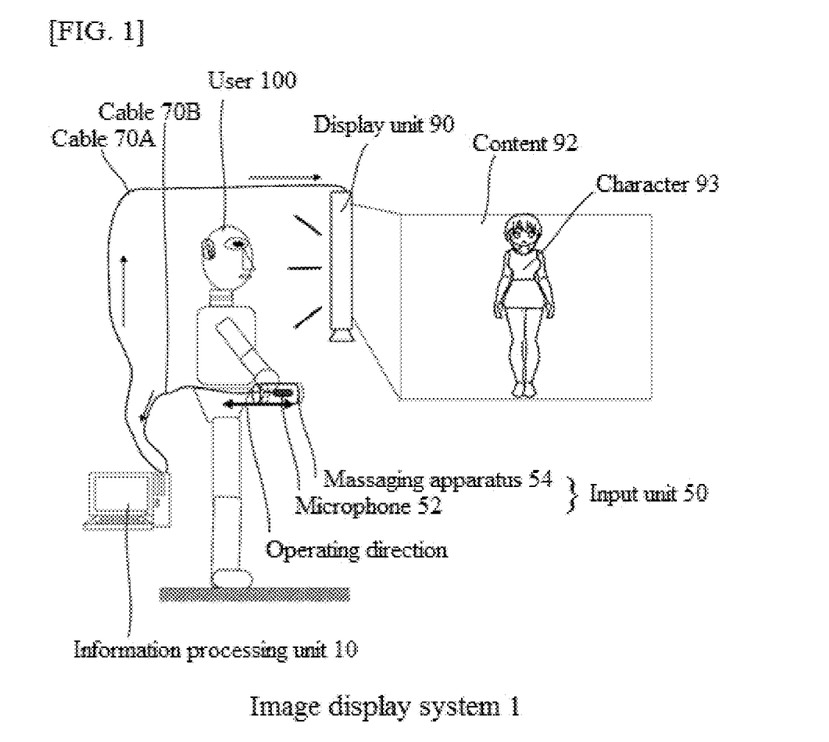
FIG. 1 A drawing explaining an overview of the image display system 1 in Example 1.

FIG. 1 is a drawing explaining an overview of the image display system 1 in Example 1.

As shown in FIG. 1, the image display system 1 in this embodiment has an information processing unit 10, an input unit 50, and a display unit 90.

The information processing unit 10 and the input unit 50 are connected to each other via a cable 70B, so that information can be sent from the input unit 50 to the information processing unit 10. The cable 70B is a cable capable of transferring sound signals, such as an RCA cable, stereo mini plug, or other analog cable, LAN cable, or other known communication means such as FM wireless communication, etc., for example. The cable 70B is not limited to any particular cable type, communication method, or communication protocol, so long as it is a cable capable of transferring sound signals.

Additionally, the information processing unit 10 and the display unit 90 are connected to each other via a cable 70A, so that information can be sent from the information processing unit 10 to the display unit 90. The cable 70A is a cable capable of transferring images, for example, an HDMI (registered trademark) cable, or D terminal cable, or other known cable, for example. It should be noted that the information processing unit 10 and the display unit 90 may be connected to each other not only by wire as mentioned above, but also wirelessly.

Additionally, the information processing unit 10 and the display unit 90 may be combined into a single unit.

The information processing unit 10 is a computer terminal that receives an input from a user 100 via the input unit 50, creates a content 92 according to the user 100 input, and displays the created content 92 on the display unit 90. The information processing unit 10 in this example is connected to the input unit 50, and to the display unit 90, via the cables 70.

The input unit 50 is an input unit that inputs sounds to the information processing unit 10. The input unit 50 is of a size that allows it to be held by hand, for example, and is constituted by a combination of a microphone 52 and a massaging apparatus 54. The input unit 50 may have the microphone 52 placed inside the massaging apparatus 54, or it may have the microphone 52 placed outside the massaging apparatus 54. It should be noted that the input unit 50 in this example has the microphone 52 placed inside the massaging apparatus 54. This way, the microphone 52 does not pick up as much noise as it would when it is placed outside the massaging apparatus 54.

The input unit 50 detects sounds generated near the massaging apparatus 54 via the microphone 52, and inputs information relating to the sound volume of the detected sounds to the information processing unit 10. Here, detected sounds include, for example, rubbing sounds that generate when the massaging apparatus 54 rubs against a human body part of the user 100, and human voice. Also, a human body part may be, for example, the head, chest, back, arm (upper arm or forearm), waist (shoulder), hip, external genitalia, or leg (thigh or calf). In this embodiment, the human body part is the external genitalia.

It should be noted that the microphone 52 represents one example of the detection means pertaining to the present invention.

The display unit 90 is a display unit with a display area where image is displayed. The display unit 90 in this example displays the image data constituting the content 92 displayed from the information processing unit 10, in the display area. Furthermore, the display unit 90 also has an acoustic device for playing back sounds, and outputs sound data relating to the image data constituting the content 92 being displayed.

Based on the aforementioned constitution, the image display system 1 in this embodiment detects via the input unit 50 the rubbing sounds generated by rubbing motions of the user, and creates a content 92 according to the sound volume of the rubbing sounds detected by the information processing unit 10. This way, the image display system 1 can modify the specific details of the content 92 to be displayed on the display unit 90 according to the sound volume of the detected rubbing sounds.

Figure 2:
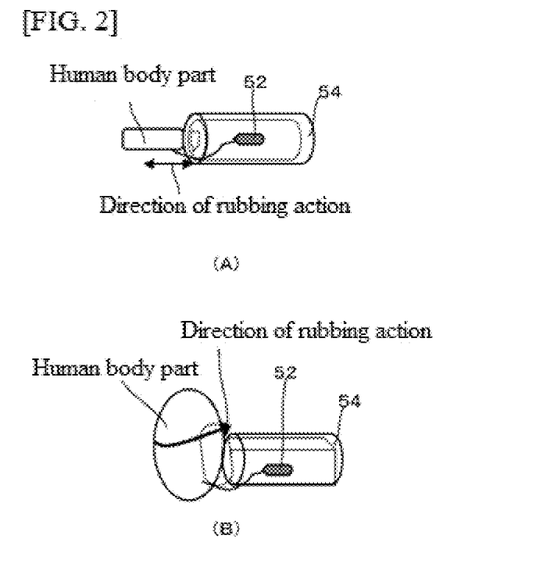
FIG. 2 A drawing explaining the constitution of the input unit 50 in FIG. 1 in greater detail.

FIG. 2 is a drawing explaining the constitution of the input unit 50 in FIG. 1 in greater detail.

As illustrated in FIG. 2 (A), the input unit 50 in this example is integrally constituted by the microphone 52 and the massaging apparatus 54 with the former placed inside the latter.

The microphone 52 can be realized with any existing microphone. Preferably the size of the microphone 52 is smaller than the massaging apparatus 54 so that the gripping of the input unit 50 by the hand of the user 100 will not be interfered with. The microphone 52 in this example is placed inside the massaging apparatus 54 at a position where it will not come in contact with the human body part of the user 100. Conceptually, inside the massaging apparatus 54 includes inside a concave part of the massaging apparatus 54 and being embedded in the massaging apparatus 54.

The massaging apparatus 54 is a massaging apparatus that has been formed in such a shape that allows it to come in contact with the human body part of the user 100 and massage the human body part. From the viewpoint of massaging the human body part of the user 100, the massaging apparatus 54 is formed by a soft material, or specifically synthetic resin, at least in the portion that comes in contact with the human body part to be massaged. The massaging apparatus 54 is formed by urethane, silicone or thermoplastic elastomer, for example. The massaging apparatus 54 may be formed by a soft material only in the portion that comes in contact with the human body part, or the entire massaging apparatus 54 may be formed by a soft material.

The massaging apparatus 54 has a male type and a female type, both of which can be realized using any existing massaging apparatus. The male-type massaging apparatus 54, as illustrated in FIG. 2 (A), is a cylindrical massaging apparatus having a concave part, in the direction of its cylindrical axis, of an appropriate size to allow a male human body part to be inserted in it. It should be noted that, in this embodiment, the male-type massaging apparatus 54 is a cylindrical sperm collection apparatus, for example. On the other hand, the female-type massaging apparatus 54, as illustrated in FIG. 2 (B), is a massaging apparatus that has been formed to an appropriate size to allow it to contact or be inserted into a female human body part. It should be noted that, in this embodiment, the female-type massaging apparatus 54 is a bar-shaped small massaging apparatus, for example.

Additionally, the massaging apparatus 54 is such that the microphone 52 is placed inside the massaging apparatus 54. Since the massaging apparatus 54 is formed by a soft material, rubbing sounds generated from the rubbing of the human body part of the user 100 become small. Accordingly, the input unit 50 in this example is such that the microphone 52 is placed inside the massaging apparatus 54 in a manner contacting the massaging apparatus 54. This way, the input unit 50 can directly detect, via the microphone 52, the rubbing sounds generated from the rubbing of the massaging apparatus 54 against the human body part of the user 100.

Figure 3:
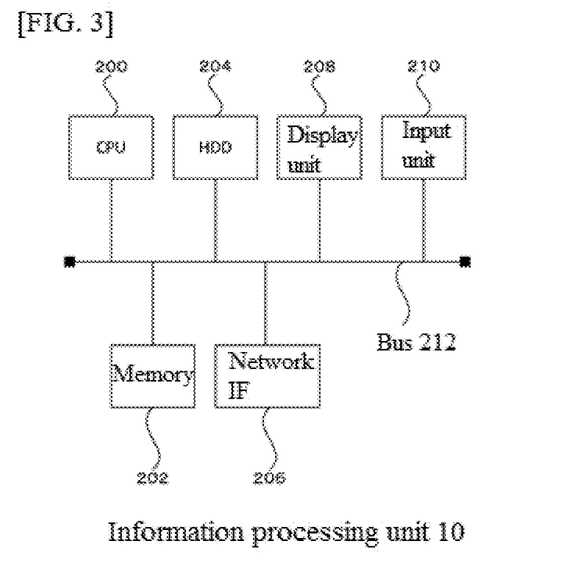
FIG. 3 A drawing illustrating the hardware constitution of the information processing unit 10.

FIG. 3 is a drawing illustrating the hardware constitution of the information processing unit 10.

As illustrated in FIG. 3, the information processing unit 10 has a CPU 200, a memory 202, a HDD 204, a network interface 206 (network IF 206), a display unit 208, and an input unit 210, which are connected to one another via a bus 212.

The CPU 200 is a central processing unit, for example.

The memory 202 is a volatile memory, for example, that functions as a main memory unit.

The HDD 204 is a hard disk drive unit, for example, that stores computer programs (such as the image display program 30 in FIG. 4) and other data files (such as the image/sound database 380 in FIG. 5) as a non-volatile memory unit.

The network IF 206 is an interface for wired or wireless communication that realizes communication with the input unit 10 and the display unit 90, for example.

The display unit 208 is a liquid crystal display, for example.

The input unit 210 is a keyboard and a mouse, for example.

Figure 4:
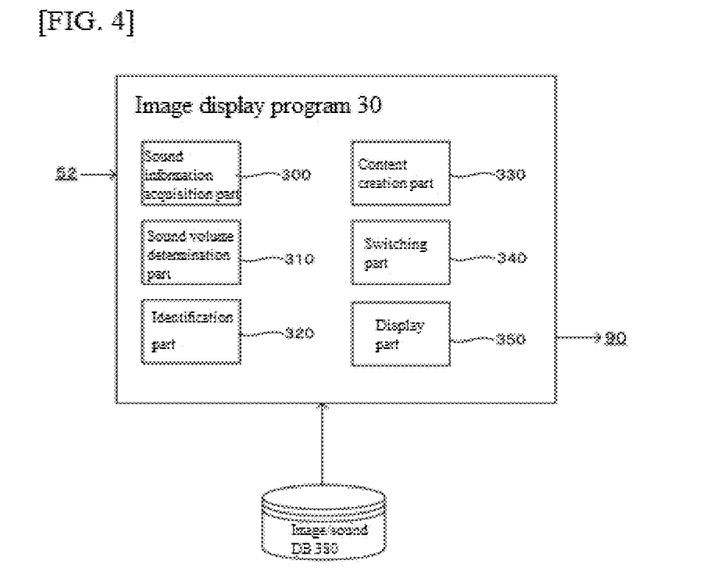
FIG. 4 A drawing illustrating the functional constitution of the information processing unit 10.

FIG. 4 is a drawing illustrating the functional constitution of the information processing unit 10.

As illustrated in FIG. 4, the information processing unit 10 in this example is such that an image display program 30 is installed, and an image/sound database 380 (image/sound DB 380) is constituted, within it.

The image display program 30 has a sound information acquisition part 300, a sound volume determination part 310, an identification part 320, a content creation part 330, a switching part 340, and a display part 350.

It should be noted that the image display program 30 may be partially or entirely realized by an ASIC or other hardware, or it may be realized by borrowing some of the functions of an OS (Operating System). Additionally, it may be installed in the information processing unit 10 via a CD-ROM or other recording medium, or it may be installed as an application.

In the image display program 30, the sound information acquisition part 300 acquires information relating to sounds that are detected by the microphone 52 of the input unit 50. Information relating to sounds refers to information of sound pressure, frequency, wavelength, period, and amplitude, for example. The sound information acquisition part 300 in this example acquires information of the amplitude or sound pressure indicating the sound volume of the detected rubbing sounds. Also, the sound information acquisition part 300, when acquiring waveform information of the detected rubbing sounds, discriminates and acquires information relating to the sound volume of the rubbing sounds, for example.

The sound volume determination part 310 determines whether or not the sound volume of the sounds acquired by the sound information acquisition part 300 exceeds a pre-determined threshold. The sound volume determination part 310 in this example determines whether or not the amplitude or sound pressure indicating the acquired rubbing sounds exceeds a pre-determined threshold. It should be noted that the sound volume determination part 310 represents only one example of the sound volume determination means pertaining to the present invention.

The identification part 320 identifies the types of contents 92 displayed on the display unit 90 by the display part 350. The identification part 320 identifies whether it is a content 92 to be displayed when the sound volume of the detected rubbing sounds exceeds the threshold, or a content 92 to be displayed when the sound volume of the detected rubbing sounds is equal to or below the threshold.

Figure 5:
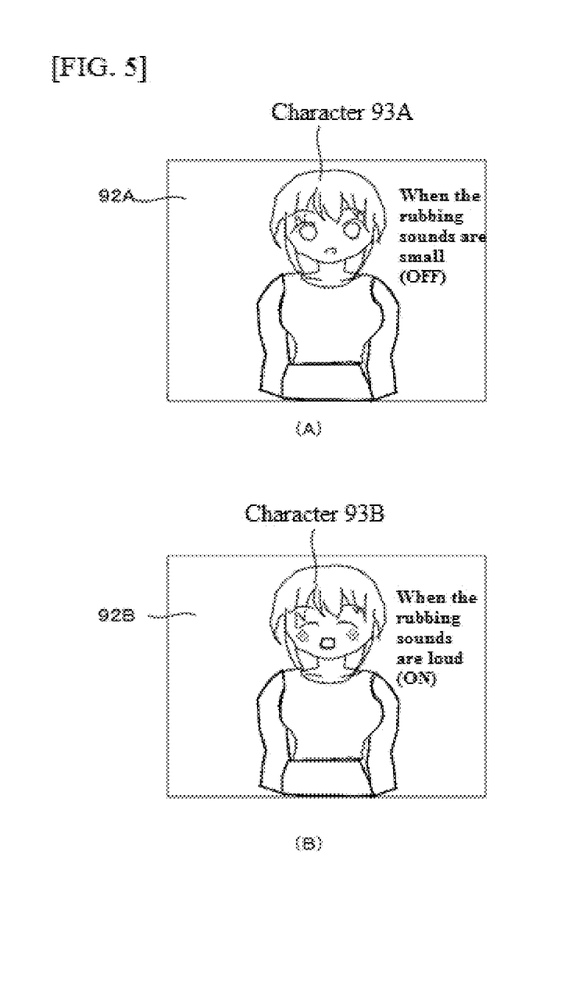
FIG. 5 A drawing illustrating content 92.

When the content 92A is displayed on the display unit 90, the identification part 320 in this example identifies the content 92A as a content to be displayed when the sound volume of the rubbing sounds is equal to or below the threshold, as illustrated in FIG. 5 (A). This content 92A is a combination of image data of a less excited character 93A and sound data relating to this image data, for example. Also, when the content 92b is displayed on the display unit 90, the identification part 320 identifies the content 92B as a content to be displayed when the sound volume of the rubbing sounds exceeds the threshold, as illustrated in FIG. 5 (B). This content 92B is a combination of image data of a more excited character 93B than the one in the content 92A and sound data relating to this image data, for example. It should be noted that the identification part 320 represents only one example of the identification means pertaining to the present invention.

The content creation part 330 creates a content 92 to be displayed on the display unit 90 according to the determination result as determined by the sound volume determination part 310. Here, content 92 refers to information constituted by a combination of image data and sound data. In this example, multiple sets of image data and multiple sets of sound data are registered in the image/sound DB 380 in a manner associated with each other.

Image data includes still image data and video data, where examples include human-like characters (such as persons and personified animals, plants, etc.), as well as their personalities, expressions, body shapes, body postures, clothes, backgrounds, etc. Also, sound data includes music, sound effects, conversations, breathings, voice, etc., for example.

The content creation part 330 uses the image data and sound data registered in the image/sound DB 380 to create, when the sound volume of the rubbing sounds exceeds the threshold, a content 92B to be displayed when the sound volume exceeds the threshold. Also, the content creation part 330 creates, when the sound volume of the rubbing sounds is equal to or below the threshold, a content 92A to be displayed when the sound volume is equal to or below the threshold. It should be noted that the content creation part 330 represents only one example of the content creation means pertaining to the present invention.

The switching part 340 dynamically switches the content 92 displayed on the display unit 90, to another content 92, according to the sound volume of the sounds detected by the microphone 52. To be specific, the switching part 340 switches the content 92 displayed on the display unit 90, according to the combination of the determination result as determined by the sound volume determination part 310 and the identification result as identified by the identification part 320. The switching part 340 in this example switches the content 92 created by the content creation part 330, and the content 92 displayed on the display unit 90, according to the sound volume of the detected sounds. If the sound volume of the rubbing sounds exceeds the threshold and the content currently displayed on the display unit 90 is a content 92A to be displayed when the sound volume of the rubbing sounds is equal to or below the threshold, the switching part 340 switches the displayed content 92A to a new content 92B to be displayed. Also, if the sound volume of the rubbing sounds is equal to or below the threshold and the content currently displayed on the display unit 90 is a content 92B to be displayed when the sound volume of the rubbing sounds exceeds the threshold, the switching part 340 switches the displayed content 92B to a new content 92A to be displayed. When switching from one content to another content, the switching part 340 may use a switching effect (transition) to switch the content displayed on the display unit 90. Also, when switching from one content 92 currently displayed to another content 92 that has been created, the switching part 340 may switch the contents only partially. For example, partial image data (face expressions only) of the contents 92 may be switched. This allows the content 92 currently displayed on the display part 350 to be modified partially in a dynamic manner. It should be noted that the switching part 340 represents only one example of the switching means pertaining to the present invention.

The display part 350 displays on the display unit 90 a content 92 according to the sound volume of the detected rubbing sounds. To be specific, the display part 350 displays on the display unit 90 a content 92 according to the sound volume of the rubbing sounds, which has been created by the content creation part 330. The display part 350 in this example displays a content 92A or content 92B created by the content creation part 330, according to the sound volume of the detected rubbing sounds. To be more specific, the display part 350 displays the content on the display unit 90 in accordance with dynamic switching of the content to be displayed by means of the switching part 340, from the content 92 currently displayed to another content 92, according to the sound volume of the detected rubbing sounds. It should be noted that the display part 350 represents only one example of the display means pertaining to the present invention.

Figure 6:
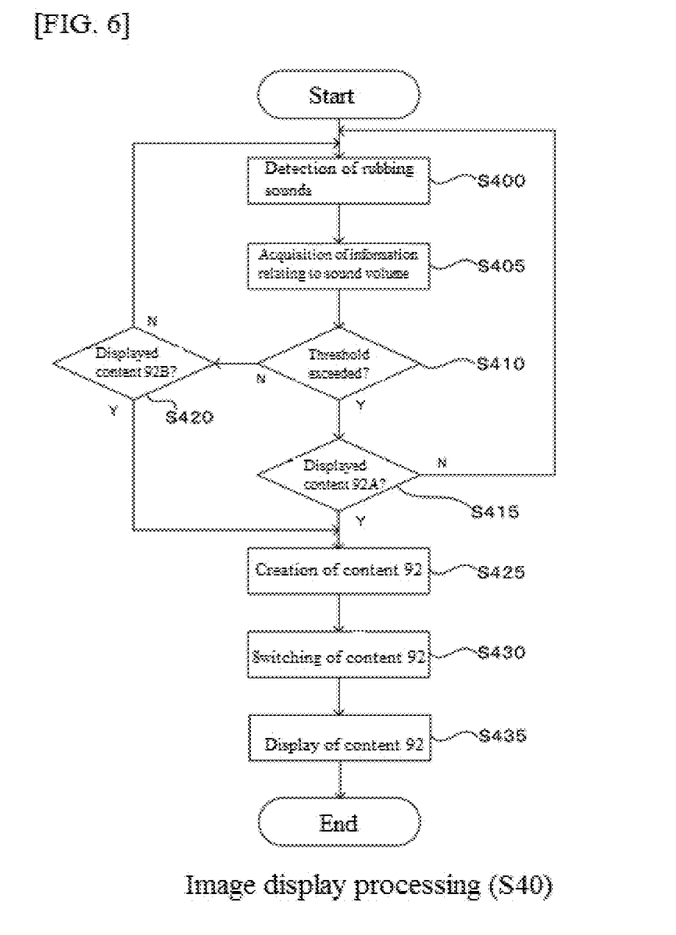
FIG. 6 A flowchart explaining the image display processing (S40) in the image display system 1.

FIG. 6 is a flowchart explaining the image display processing (S40) in the image display system 1.

Figure 7:
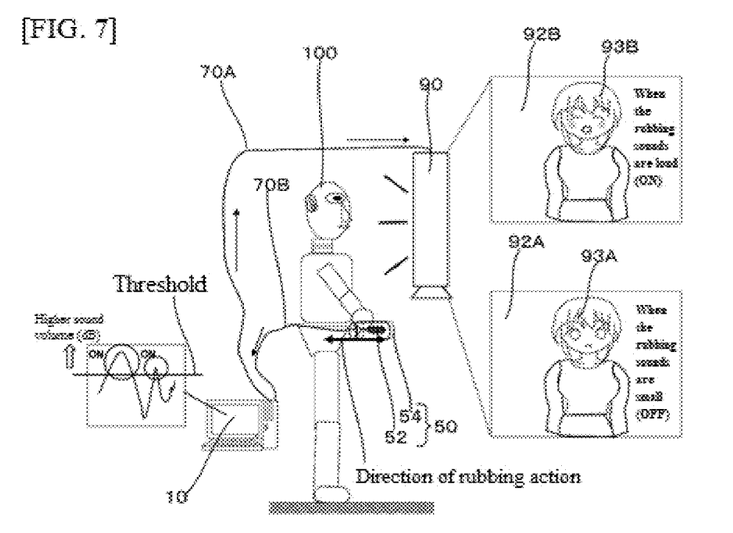
FIG. 7 A drawing explaining the image display processing (S40) in FIG. 6.

FIG. 7 is a drawing explaining the image display processing (S40) in FIG. 6.

It should be noted that, with regard to the image display processing, the user 100 uses the input unit 50 to move the human body part of the user 100 in massaging motion in the direction of rubbing actions to generate rubbing sounds, which triggers this processing. If the massaging apparatus 54 of the input unit 50 is of male type, the male user 100 inserts his male human body part into the massaging apparatus 54 and moves it in the direction of rubbing actions to generate rubbing sounds. If the massaging apparatus 54 of the input unit 50 is of female type, on the other hand, the female user 100 presses her female human body part against the massaging apparatus 54 and rubs it in the direction of rubbing actions to generate rubbing sounds.

As illustrated in FIG. 6 and FIG. 7, in Step 400 (S400), the microphone 52 detects the rubbing sounds generating near the massaging apparatus 54. As illustrated in FIG. 7, the microphone 52 detects the rubbing sounds generating from the rubbing of the human body part of the user 100 against the massaging apparatus 54.

In Step 405 (S405), the sound information acquisition part 300 acquires information of the amplitude or sound pressure indicating the sound volume of the rubbing sounds detected by the microphone 52.

In Step 410 (S410), the sound volume determination part 310 determines whether or not the acquired sound volume of the rubbing sounds exceeds a pre-determined threshold. The image display processing (S40) proceeds to the processing of S415 if the acquired sound volume of the rubbing sounds exceeds the pre-determined threshold; alternately, it proceeds to the processing of S420 if the acquired sound volume of the rubbing sounds is equal to or below the pre-determined threshold.

In Step 415 (S415), the identification part 320 identifies whether the content 92 currently displayed on the display unit 90 is of a type of content 92B to be displayed when the sound volume of the detected rubbing sounds exceeds the threshold, or of a type of content 92A to be displayed when the sound volume of the detected rubbing sounds is equal to or below the threshold. The image display processing (S40) proceeds to the processing of S425 to create a new content 92B to be displayed, if the sound volume of the rubbing sounds exceeds the pre-determined threshold and a content 92A is currently displayed on the display unit 90. Also, the image display processing (S40) returns to the processing of S400, if the sound volume of the rubbing sounds exceeds the pre-determined threshold and a content 92B is currently displayed.

In Step 420 (S420), the identification part 320 identifies whether the content 92 currently displayed on the display unit 90 is of a type of content 92B to be displayed when the sound volume of the detected rubbing sounds exceeds the threshold, or of a type of content 92A to be displayed when the sound volume of the detected rubbing sounds is equal to or below the threshold. The image display processing (S40) proceeds to the processing of S425 to create a new content 92A to be displayed, if the sound volume of the rubbing sounds is equal to or below the pre-determined threshold and a content 92B is currently displayed on the display unit 90. Also, the image display processing (S40) returns to the processing of S400, if the sound volume of the rubbing sounds is equal to or below the pre-determined threshold and a content 92A is currently displayed.

In Step 425 (S425), the content creation part 330 acquires the image data and sound data registered in the image/sound DB 380 to create a content 92 to be displayed on the display unit 90 according to the sound volume of the rubbing sounds. If the sound volume of the rubbing sounds exceeds the threshold, the content creation part 330 creates a content 92B to be displayed when the sound volume exceeds the threshold. Also, if the sound volume of the rubbing sounds is equal to or below the threshold, the content creation part 330 creates a content 92A to be displayed when the sound volume is equal to or below the threshold.

In Step 430 (S430), if the sound volume of the rubbing sounds exceeds the threshold and a content 92A to be displayed when the sound volume is equal to or below the threshold is currently displayed on the display unit 90, the switching part 340 switches the currently displayed content 92A to a new content 92B to be displayed. Also, if the sound volume of the rubbing sounds is equal to or below the threshold and a content 92B to be displayed when the sound volume exceeds the threshold is currently displayed on the display unit 90, the switching part 340 switches the currently displayed content 92B to a new content 92A to be displayed.

In Step 435 (S435), the display part 350 dynamically switches the contents 92A, 92B created by the content creation part 330, according to the sound volume of the rubbing sounds, and displays the result on the display unit 90.

It has been explained above that, according to the image display system 1 in this embodiment, the input unit 50 can directly detect via the microphone 52 the rubbing sounds from the rubbing of the massaging apparatus 54 and the human body part of the user 100, because the microphone 52 is placed inside the massaging apparatus 54 in a manner contacting the massaging apparatus 54. In other words, the input unit 50 can selectively detect small rubbing sounds.

Additionally, the image display system 1 can detect in real time the timings at which the user applies massaging stimulations to himself or herself, which means that the content displayed on the display unit can be switched synchronically with the rubbing action motion in which massaging stimulations are applied from a content of low excitability to a content of high excitability, or from a content of high excitability to a content of low excitability. This way, greater massaging effects can be achieved compared to what normal male masturbation aids can, and moreover, virtual experience devices that utilize these effects can also be developed.

Additionally, the method based on detection of rubbing sounds is different from the detection methods using piezoelectric elements, button switches, etc., in that, in the case of a male user, it allows the rubbing state of the massaged area to be detected without being affected by the size of the area.

Additionally, the image display system 1 is not limited to using the sound volume of rubbing sounds; instead, it can be arranged to run complex processing by utilizing, for example, sound waveform information, or specifically information of frequency, wavelength, period, etc., which allows the system to function as a user interface not achievable with piezoelectric elements.

VARIATION EXAMPLE 1

Figure 8:
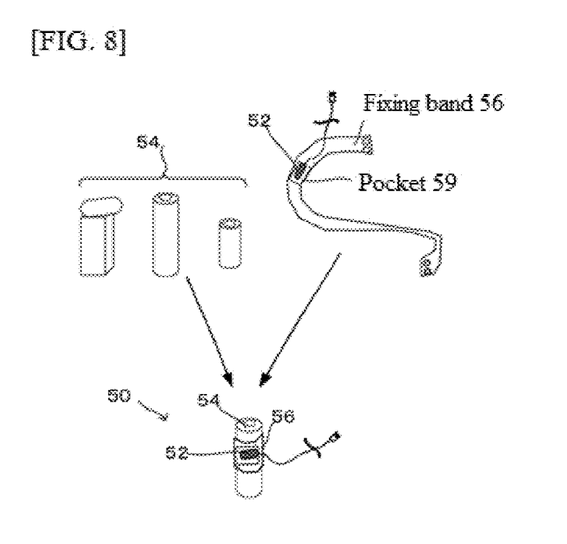
FIG. 8 A drawing explaining the constitution of the input unit 50 in Variation Example 1 of Example 1.

FIG. 8 is a drawing explaining a constitutional variation example of the input unit 50 in Example 1.

As illustrated in FIG. 8, the input unit 50 in this Variation Example 1 has a microphone 52 placed outside a massaging apparatus 54. Outside the massaging apparatus 54 means the exterior wall side of the massaging apparatus 54, for example. The input unit 50 in this Variation Example 1 combines the microphone 52 and the massaging apparatus 54 by looping around the exterior wall side of the massaging apparatus 54, in a freely removable manner, a fixing band 56 to which the microphone 52 is attached.

The microphone 52 effectively has the same function and constitution as described in Example 1 above. The microphone 52 in this example is fixed to the outside of the massaging apparatus 54 in a state where it is fixed in place by the fixing band 56.

The massaging apparatus 54 effectively has the same function and constitution as described in Example 1 above, so it is denoted by the same symbol and not explained redundantly.

The fixing band 56 is shaped like a band and has a hook-and-loop fastener, snap or other fitting parts at both ends so that it can be fixed in place in a freely removable manner by pressing together the fitting parts at both ends. Additionally, the fixing band 56 has a bag-like pocket 59 to allow the microphone 52 to be stored inside the pocket 59.

As explained above, the input unit 50 in this Variation Example 1 is constituted by the microphone 52 placed outside the massaging apparatus 54 via the fixing band 56. By adopting this constitution where the fixing band 56 is looped around the massaging apparatus 54, the input unit 50 allows the microphone 52 to be fixed to massaging apparatuses 54 of various different thicknesses. This means that the input unit 50 can be used with massaging apparatuses 54 of various different thicknesses and shapes simply by looping the fixing band 56 around any such massaging apparatus 54. As a result, users can continue to use their favorite massaging apparatuses 54 they have been using.

Additionally, in the input unit, the microphone installation position is arranged near the massaging apparatus which is the generation source of rubbing sounds, so noise is not picked up easily. In the meantime, regarding the installation position of the microphone, its installation location can be modified as deemed appropriate, so long as it is within a range where rubbing sounds can be detected, which leads to a high degree of installation location flexibility.

VARIATION EXAMPLE 2

An image display system 2 in this Variation Example 2 represents a system that permits communication with multiple users. The image display system 2 in this Variation Example 2 has a LAN interface in the information processing unit 10, for example. Multiple image display systems, which are each the image display system 2, are interconnected via a network. Each image display system 2 connected to the network has a web camera in the information processing unit 10, to allow its user who captures an image using the web camera to send the captured image to another user.

Figure 9:
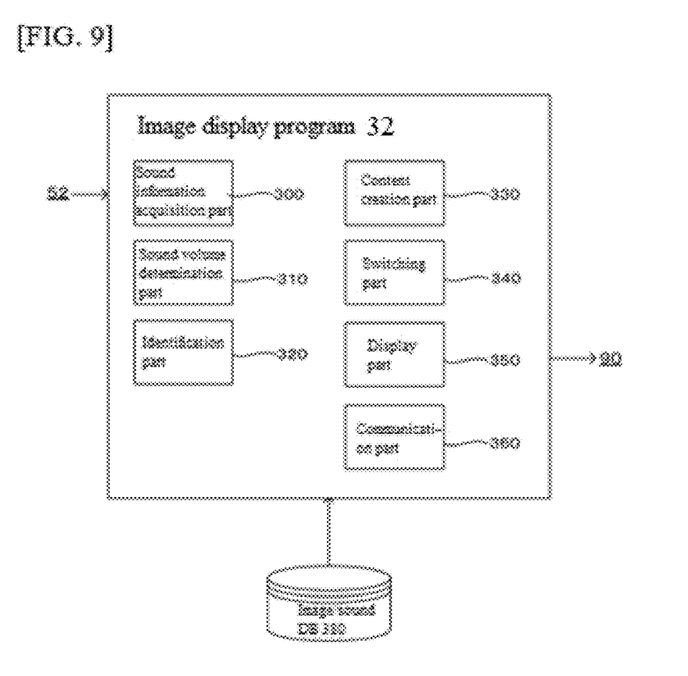
FIG. 9 A drawing explaining the functional constitution of the information processing unit 10 in Variation Example 2 of Example 1.

FIG. 9 is a drawing explaining the functional constitution of the information processing unit 10 in Variation Example 2 of Example 1.

As illustrated in FIG. 9, an image display program 32 installed in the information processing unit 10 of this Variation Example 2 further has a communication part 360 in addition to the sound information acquisition part 300, sound volume determination part 310, identification part 320, content creation part 330, switching part 340, and display part 350.

The communication part 360 sends and receives captured images via the network. To be specific, when receiving a captured image, the communication part 360 receives the captured image sent from the user who has sent the captured image. Also, when sending a captured image, the communication part 360 sends the image captured by the web camera connected to the information processing unit 10, to another user.

Here, a captured image is included in the image data of a content 92. A captured image is a video image or still image. Also, video images include captured video images and video images currently being captured. It should be noted that the communication part 360 in this example receives in real time a video image currently being captured, as image data of a content 92. This way, the display part 350 can display the contents 92 received from the communication part 360 while switching them according to the sound volume of the detected rubbing sounds.

It should be noted that the communication part 360 represents only one example of the communication means pertaining to the present invention.

Additionally, the sound information acquisition part 300, sound volume determination part 310, identification part 320, content creation part 330, switching part 340, and display part 350, effectively have the same functions and constitutions as described in Example 1 above, so they are denoted by the same symbols and not explained redundantly.

As described above, the image display system 2 in this Variation Example 2 allows multiple image display systems to be inter-connected via a network, with a web camera connected to the information processing unit 10 of each system. This way, users who are physically away from each other (such as a wife and a husband, a couple, etc.) can be displayed on their respective display units as captured images via the web cameras. Also, the image display systems 2 may each display on its display unit the images captured by the other system, modifying the displayed images in real time according to the sound volume of the rubbing sounds detected by the microphone.

VARIATION EXAMPLE 3

An image display system 3 in Variation Example 3 of Example 1 represents a system that selectively performs threshold judgment on the rubbing sounds generated from the rubbing of a human body part of the user 100 against the massaging apparatus 54. In other words, the image display system 3 efficiently performs threshold judgment on the rubbing sounds generated from the rubbing of a human body part against the massaging apparatus 54, even when the rubbing sounds detected by the microphone 52 near the massaging apparatus 54 include various sounds.

Figure 10:
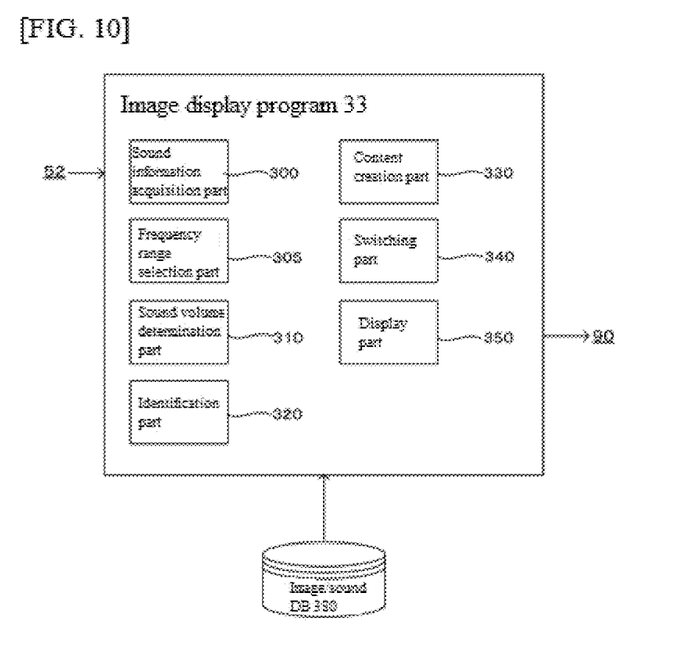
FIG. 10 A drawing explaining the functional constitution of the information processing unit 10 in Variation Example 3 of Example 1.
Figure 11:
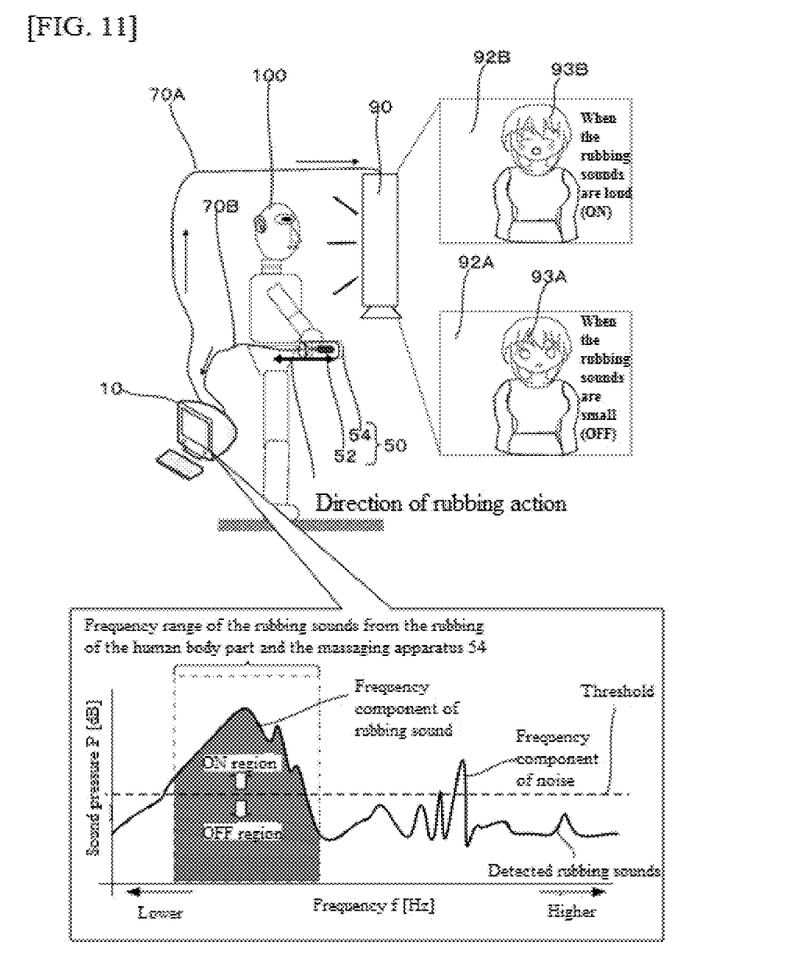
FIG. 11 A drawing explaining the frequency range selection part 305 in Variation Example 3.

FIG. 10 is a drawing explaining the functional constitution of the information processing unit 10 in Variation Example 3 of Example 1. Also, FIG. 11 is a drawing explaining the frequency range selection part 305 in Variation Example 3.

As illustrated in FIG. 10, an image display program 33 installed in the information processing unit 10 of this Variation Example 3 further has a frequency range selection part 305 in addition to the sound information acquisition part 300, sound volume determination part 310, identification part 320, content creation part 330, switching part 340, and display part 350.

As illustrated in FIG. 10, the frequency range selection part 305 selects a frequency range for the rubbing sounds primarily generated from the rubbing of a human body part (external genitalia) against the massaging apparatus 54, among the rubbing sounds detected by the microphone 52. To be specific, the rubbing sounds detected by the microphone 52 include rubbing sounds generated from the rubbing of the external genitalia against the massaging apparatus 54, as well as rubbing sounds other than the rubbing sounds generated from the rubbing of the external genitalia against the massaging apparatus 54 (hereinafter referred to as "noise"), as illustrated in FIG. 11. Accordingly, the frequency range selection part 305 selects a frequency range representing the rubbing sounds generated from the rubbing of the external genitalia against the massaging apparatus 54. In selecting a frequency range for the rubbing sounds, the frequency range selection part 305 performs fast Fourier transform (FFT: Fast Fourier Transform), discrete Fourier transform (DFT: discrete Fourier transform) or other processing, for example. Also, the frequency range selection part 305 may have the frequency range of the rubbing sounds set by the user 100. This way, the frequency range selection part 305 can extract, or separate, the loudness of rubbing sounds corresponding to each frequency component, from the rubbing sounds detected by the microphone 52.

The sound volume determination part 310 determines, within the frequency range of the rubbing sounds generated from the rubbing of the external genitalia against the massaging apparatus 54, as selected by the frequency range selection part 305, whether or not the amplitude or sound pressure indicating the sound volume of the rubbing sounds exceeds a pre-determined threshold.

Additionally, the sound information acquisition part 300, identification part 320, content creation part 330, switching part 340, and display part 350, effectively have the same functions and constitutions as described in Example 1 above, so they are denoted by the same symbols and not explained redundantly.

It has been described above that, according to the information processing unit 10 of the image display system 3 in this Variation Example 3, threshold judgment can be performed selectively on the frequency range of the rubbing sounds generated from the rubbing of the external genitalia against the massaging apparatus 54, among the rubbing sounds detected by the microphone 52. This way, the image display system 3 can eliminate other unnecessary noise in the ambient environment, thus improving the accuracy of threshold judgment.

Also, the image display system 3 in Variation Example 3 may be used with a lubricant applied on the input unit 50. As a result, the information processing unit 10 can perform threshold judgment on the frequency range of rubbing sounds as selected by the frequency range selection part 305, by taking into account the sounds generated by the lubricant 60 that are included in the detection rubbing sounds.

VARIATION EXAMPLE 4

While the input unit 50 in Example 1 above was explained in a mode where no lubricant was used, the input unit 50 in Variation Example 4 is explained in a mode where a lubricant 60 is used.

Figure 12:
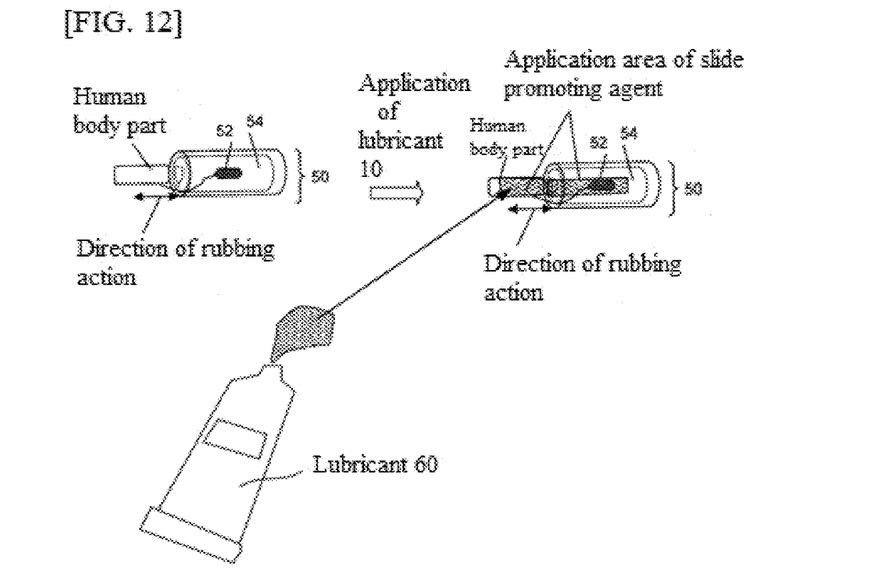
FIG. 12 A drawing explaining the condition in which the input unit 50 in Variation Example 4 of Example 1 is used.

FIG. 12 is a drawing explaining the condition in which the input unit 50 in Variation Example 4 of Example 1 is used.

As illustrated in FIG. 12, the input unit 50 in Variation Example 4 is used with a lubricant 60 applied on the inside or outside of the massaging apparatus 54. The input unit 50 in this Variation Example 4 is used with the user 100 applying a lubricant 60 on the inside of a male-type massaging apparatus 54 having a concave part, for example. Here, the lubricant 60 is a lubricant designed to lessen the frictional resistance between the massaging apparatus 54 and a human body part, such as a lotion, oil, cream or gel, for example.

This way, the input unit 50 can rub a human body part of the user 100 in a condition where the lubricant 60 is applied on the inside of the massaging apparatus 54, thereby detecting the rubbing sounds, including the sounds generated by the lubricant 60, via the microphone 52.

VARIATION EXAMPLE 5

Figure 13:
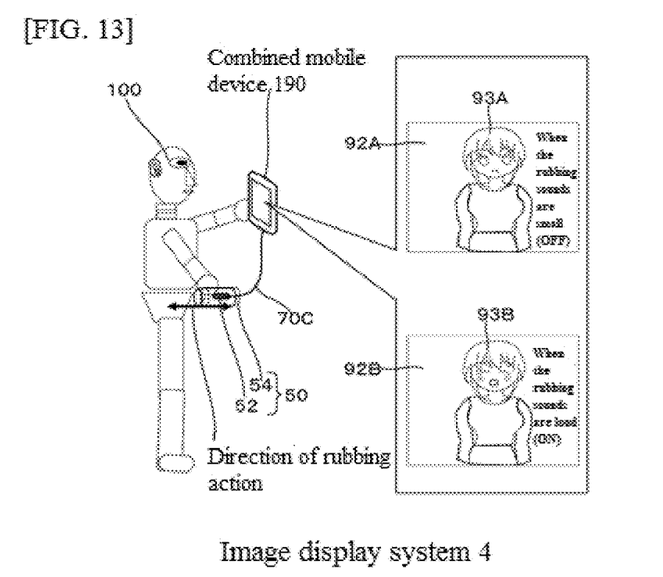
FIG. 13 A drawing explaining the constitution of the image display system 4 in Variation Example 5 of Example 1.

FIG. 13 is a drawing explaining the constitution of the image display system 4 in Variation Example 5 of Example 1.

As illustrated in FIG. 13, the image display system 4 comprises an input unit 50 and a combined mobile device 190. The image display system 4 connects the input unit 50 and the combined mobile device 190 via a cable 70C, so that information can be sent from the input unit 50 to the combined mobile device 190. The cable 70C is a cable capable of transferring sound signals, such as an RCA cable, stereo mini plug, or other analog cable, LAN cable, or other known communication means such as FM wireless communication, etc., for example. The cable 70C is not limited to any particular cable type, communication method, or communication protocol, so long as it is a cable capable of transferring sound signals.

The combined mobile device 190 is a mobile-type electronic device combining the information processing unit 10 and display unit 90 explained in Example 1 above, into a single unit. The combined mobile device 190 is a PDA, tablet terminal, smartphone, wearable terminal, etc., for example. The combined mobile device 190 has a connection terminal for connecting the cable 70C.

As described above, the image display system 4 can be used easily by the user who only needs to connect the input unit 50 to a portable combined mobile device 190 via a cable 70C.

VARIATION EXAMPLE 6

Figure 14:
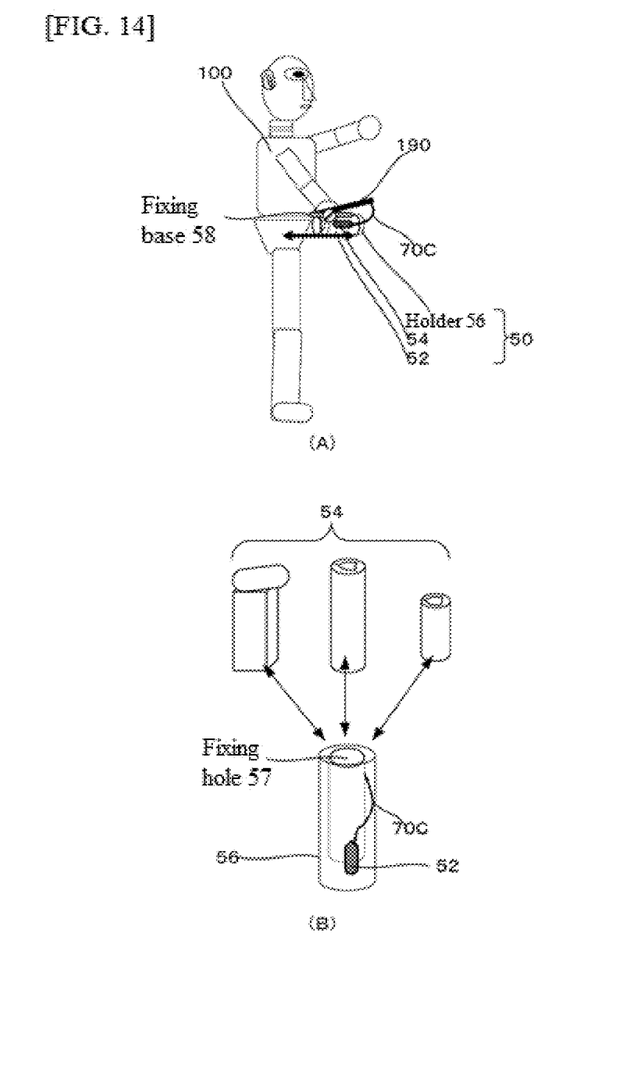
FIG. 14 A drawing explaining the constitution of the input unit 50 in Variation Example 6 of Example 1.

FIG. 14 is a drawing explaining the constitution of the input unit 50 in Variation Example 6 of Example 1.

As illustrated in FIG. 14, the input unit 50 in this Variation Example 6 further has a holder 56 and a fixing base 58, in addition to the microphone 52 and massaging apparatus 54.

The holder 56 is a supporting tool that supports the massaging apparatus 54. The holder 56 has a fixing hole 57 at one end part of its cylindrical body, as illustrated in FIG. 14 (B). The fixing hole 57 is a concaved non-through hole provided in the holder 56 in the direction of its cylindrical axis, and has a size appropriate for fixing in place the massaging apparatus 54 that has been inserted therein.

Additionally, the holder 56 is formed by a soft material, for example, and specifically it is formed by urethane or other low-resilience material. Accordingly, the holder 56 allows the massaging apparatus 54 to be fixed in place in the fixing hole 57 in a freely removable manner so as to prevent the massaging apparatus 54 from dropping out of the fixing hole 57 due to rubbing actions.

Additionally, the holder 56 has a microphone 52 placed near the massaging apparatus 54 formed by a soft material. To be specific, the holder 56 has a microphone 52 placed either inside of the fixing hole 57 or on the surface of the fixing hole 57. Also, the holder 56 may have a microphone 52 placed in such a way that it is embedded in the holder 56. Having a microphone 52 placed near the massaging apparatus 54 formed by a soft material, the holder 56 allows the microphone 52 to detect rubbing sounds directly.

The fixing base 58 is a base for retaining the combined mobile device 190 in a fixed state. The fixing base 58 is integrally connected to the holder 56. The fixing base 58 has, for example, gripping pieces for gripping both ends of the combined mobile device 190, and uses the gripping pieces to fix the combined mobile device 190 in place with an appropriate gripping strength to not let the combined mobile device 190 drop out. This way, the fixing base 58 can be used with combined mobile devices 190 of various different shapes.

As described above, the input unit 50 in this Variation Example 6 allows existing massaging apparatuses 54 of various different shapes to be fixed in place in the holder 56. This means that the input unit 50 can be used with massaging apparatuses 54 of shapes that make it difficult to fix the microphone 52 in place. Also, when the microphone 52 is fixed in place inside the holder 56, the input unit 50 can eliminate excess sounds in the ambient environment, thereby allowing the microphone 52 to detect rubbing sounds efficiently.

Additionally, the input unit 50 can be integrally constituted by the holder 56 and the fixing base 58, in which case the user 100 can use the input unit 50 without occupying both hands.

INDUSTRIAL FIELD OF APPLICATION

The present invention is an image display system that can augment massaging, and therefore finds industrial fields of application.

DESCRIPTION OF THE SYMBOLS 1, 4 Image display system
10 Information processing unit
50 Input unit
52 Microphone
54 Massaging apparatus
56 Holder
58 Fixing base
60 Lubricant
90 Display unit
92 Content
190 Combined mobile device
30, 32, 33 Image display program
300 Sound information acquisition part
310 Sound volume judgment part
320 Identification part
330 Content creation part
340 Switching part
350 Display part
360 Communication part
56 Fixing band
305 Frequency range selection part
190 Combined mobile device

What is claimed is:

1. An image display system that includes an input unit and an information processing unit, wherein:
the input unit has:
a massaging apparatus for massaging a human body part; and
a microphone placed inside or outside the massaging apparatus to detect sounds near the massaging apparatus; and
the information processing unit has:
a sound volume determination means for determining whether or not a sound volume of the sounds detected by the microphone exceeds a pre-determined threshold;
a switching means for switching first content to second content, or the second content to the first content, according to a determination result as determined by the sound volume determination means, wherein each of the first content and the second content is constituted by a combination of image data and sound data derived from data stored in an image/sound database; and
a display means for displaying the first or second content.

2. The image display system according to claim 1, wherein:
the human body part is an external genitalia;
a portion of the massaging apparatus that comes in contact with the human body part to be massaged is formed by a soft material;
the microphone detects sounds generated from a rubbing of the external genitalia against the massaging apparatus; and
the switching means switches the first to second content or the second to first content to be displayed according to the sound volume of the sounds generated from the rubbing of the external genitalia against the massaging apparatus and displays a resulting content.

3. The image display system according to claim 2, wherein:
further provided is a frequency range selection means for selecting a frequency range for the rubbing sounds, among the sounds detected by the microphone, which are primarily from the rubbing of the external genitalia against the massaging apparatus;
the sound volume determination means determines, within the frequency range of the rubbing sounds from the rubbing of the external genitalia against the massaging apparatus as selected by the frequency range selection means, whether or not the sound volume of the rubbing sounds exceeds a pre-determined threshold; and
the switching means switches the first to second content or the second to first content according to a determination result as determined by the sound volume determination means.

4. The image display system according to claim 3, wherein:
the massaging apparatus has a lubricant applied on an inside or outside of the massaging apparatus;
the microphone detects sounds near the massaging apparatus on which the lubricant has been applied;
the sound volume determination means determines whether or not the sound volume of the rubbing sounds including sounds generated by the lubricant exceeds a pre-determined threshold; and
the switching means switches the first to second content or the second to first content according to a determination result as determined by the sound volume determination means.

5. The image display system according to claim 4, wherein:
the information processing unit is a combined mobile device that has been combined with a display unit that displays content, and further has a connection cable for connecting the input unit and the combined mobile device so that the rubbing sounds detected by the microphone can be transmitted; and
the switching means switches the first to second content or the second to first content to be displayed on the display unit according to the sound volume of the rubbing sounds transmitted via the connection cable and displays a resulting content.

6. The image display system according to claim 5, wherein:
the information processing unit further has a communication means for communicating contents of interest which constitute the first and/or second content(s); and
the display means displays the first or second content received from the communication means wherein the switching means switches the first to second content or the second to first content according to the sound volume of the detected sounds.

7. An image display method using the image display system of claim 1, comprising:
a step to detect sounds via the microphone of the input unit; and
a step to display the first or second content by the display means after switching them by the switching means according to a sound volume of the detected sounds.

8. A non-transitory computer readable storage medium storing a program installed in the image display system of claim 1, said program causing a computer to implement:
a step to detect sounds via the microphone of the input unit; and
a step to display the first or second content by the display means after switching them by the switching means according to a sound volume of the detected sounds.

* * * * *